· US006781710B1

United States Patent
Simpson et al.

(10) Patent No.: US 6,781,710 B1
(45) Date of Patent: Aug. 24, 2004

(54) PRINT JOB CAPTURE SUBSYSTEM WITH PASS-THROUGH SUPPORT

(75) Inventors: Shell S. Simpson, Boise, ID (US); James A. Hewitt, Meridian, ID (US); Ernest F. Covelli, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/536,032

(22) Filed: Mar. 27, 2000

(51) Int. Cl.[7] ............................ G06F 3/12; G06F 13/00
(52) U.S. Cl. .................................. 358/1.15; 358/1.13
(58) Field of Search ............................... 358/1.9, 1.15, 358/1.14, 1.13, 1.2, 1.4, 1.6, 1.16, 1.18, 524, 501, 539

(56) References Cited

U.S. PATENT DOCUMENTS

| 5,210,824 | A | | 5/1993 | Putz et al. | ............... 395/145 |
|---|---|---|---|---|---|
| 5,228,118 | A | * | 7/1993 | Sasaki | ............... 358/1.13 |
| 5,481,367 | A | | 1/1996 | Yokoe et al. | ............... 358/296 |
| 5,568,594 | A | | 10/1996 | Suzuki | ............... 395/112 |
| 5,699,494 | A | | 12/1997 | Colbert et al. | ............... 395/114 |
| 5,727,135 | A | | 3/1998 | Webb et al. | ............... 395/113 |
| 5,754,748 | A | | 5/1998 | Rivers et al. | ............... 395/116 |
| 5,838,887 | A | | 11/1998 | Murakami | ............... 395/112 |
| 5,975,775 | A | | 11/1999 | Ota | ............... 400/62 |
| 6,433,882 | B1 | * | 8/2002 | Mori et al. | ............... 358/1.13 |

FOREIGN PATENT DOCUMENTS

| EP | 0653700 A1 | 10/1994 | ............ G06F/3/12 |
|---|---|---|---|
| EP | 0847002 A1 | 11/1997 | ............ G06F/3/12 |
| GB | 2332764 | 11/1998 | ............ G06F/3/12 |

* cited by examiner

*Primary Examiner*—Gabriel Garcia
*Assistant Examiner*—Douglas Tran

(57) ABSTRACT

In response to print job communications from an application submitting a print job, a driver arrangement provides a driver type response appropriate for any pass-through data contained in the print job. Driver receives the data making up the print job and creates an intermediate representation of the print job comprising translated nonpass-through data and untranslated data comprising buffers of pass-through data. A data handler is associated with the pass-through data, and is responsible for directing the printing of the pass-through data at the designated printer.

25 Claims, 4 Drawing Sheets

PRINT JOB CAPTURE SUBSYSTEM WITH PASS-THROUGH SUPPORT

TECHNICAL FIELD OF THE INVENTION

This invention relates generally to software for use in editing and delivering print jobs to a printer and, more particularly, to a system for capturing print jobs containing pass-through data. The invention includes a method for capturing print jobs containing pass-through data, and also an apparatus and computer program product for capturing print jobs containing pass-through data.

BACKGROUND OF THE INVENTION

A collection of information directed from a computer to a printing device is commonly referred to as a print job. The information may be in the form of text or graphics, and the printing device to which the print job may be directed may comprise a printer or display terminal, for example. Output resources, including printers, display terminals, and any other devices to which a print job may be directed, will be referred to in this disclosure simply as "printers". Computer programs or applications which may produce print jobs commonly include a user interface such as a print dialog box graphical interface through which the application user may order and, to some extent, control print jobs. However, the printer user interface provided in many software applications often provides only minimal features to control the print job. In particular, the printer control interface provided in many software applications does not expose, or provide access to, advanced capabilities which may be available in certain printers. For this reason, many of the more advanced capabilities which may be built into printers go unnoticed and unused by a majority of software users.

Many software applications direct print jobs to a printer through specialized program code referred to as a driver. The printer driver translates the data representing the print job into a format which the printer can understand. A more recent class of printing software allows print jobs to be edited outside of a printer driver and provides more options to control the print job. Software in this class may be referred to as a "job editing and delivery system". Job editing and delivery systems are of particular interest to printer manufacturers because the software makes advanced printer capabilities visible or available to a user.

A job editing and delivery system captures a print job from a software application and provides the user with the opportunity to interactively modify the printer settings. Users may choose print job features such as "n-up" ("n" page images from a print job on one sheet), watermarks, and booklet printing, for example. After the user has finished choosing the desired print job settings, the print job is then sent to a printer the user has designated.

One option available in certain software applications which create print jobs allows certain designated data to pass through to the printer for printing without modification by the operating system or printer driver. This option is referred to as "pass-through", and the data which passes-through to the printer without modification by the operating system or printer driver is referred to as "pass-through data". Although data other than pass-through data included in a print job is translated either by operating system components or the printer driver, the pass-through data remains untranslated and is simply directed to the printer in its untranslated state.

Since pass-through data may comprise any data designated by the user, the pass-through feature must be used carefully. Care must normally be taken to ensure that the pass-through data is compatible with the accompanying data included in the print job. For example, including pass-through PostScript® data in a print job directed to a PCL printer will cause the data stream to become invalid since the PCL printer will be unable to interpret the PostScript® commands included in the PostScript® data. For this reason, applications which allow pass-through commonly provide an arrangement for determining the printer language or technology type before issuing pass-through data to the printer. If the printer technology type is incompatible with the proposed pass-through data, the application may notify the user and may send the print job in some modified form without the desired pass-through data. Also, not all printer drivers support or allow pass-through. Thus, applications which allow pass-through commonly provide an arrangement for determining whether the target printer driver supports pass-through before issuing a job which includes pass-through data.

Current job editing and delivery systems commonly do not support pass-through. Thus, users desiring the ability to include pass-through data in print jobs may not have access to the advantages available in job editing and delivery systems.

SUMMARY OF THE INVENTION

It is an object of the invention to provide a job capture subsystem which supports pass-through in a job editing and delivery system. The invention includes a method of capturing a print job in a job editing and delivery system, as well as an apparatus and computer program product for capturing a print job in a job editing and delivery system.

The invention utilizes a unique printer driver arrangement for print jobs delivered to a printer through a job editing and delivery system. The driver arrangement includes computer program code which maintains a plurality of driver-type elements. These driver-type elements can be used to produce any one of a plurality of driver type responses. Each driver type response is specific to a particular printer technology type such as PCL or PostScript®, for example. Thus, the driver arrangement according to the invention is capable of presenting itself as any of a number of different printer drivers. In particular, the present driver arrangement is capable of presenting itself as a type of driver that can handle the particular pass-through data in a print job.

Before a print job which includes pass-through data is sent to the job editing and delivery system, the application from which the job originates queries the present driver just as in prior art arrangements. That is, the application queries the driver to make sure the driver can support the printer technology type of pass-through data in the print job. This query is in the form of print job communications to the driver. In response to the print job communications, the driver arrangement according to the invention provides an appropriate driver type response using the various driver-type elements maintained by the driver. The appropriate driver type response is the correct response for the pass-through data in the print job. Thus, the driver according to the invention reports or presents itself as the appropriate driver for the printer technology type of the pass-through data, regardless of the type of pass-through data and regardless of the type of printer which may be designated for the print job.

After the present driver arrangement provides the appropriate driver type response to the application originating the print job, the data making up the print job is sent to the driver arrangement and the arrangement translates the original print job data into an intermediate representation. This intermediate representation of the print job includes translated data and untranslated data. The translated data comprises data representing portions of the print job other than the pass-through data, while the untranslated data represents buffers of pass-through data.

The present print job capture arrangement also includes a storage arrangement for storing the intermediate representation until needed to draw an image in the print job to a designated printer. In the preferred form of the invention, the job capture arrangement includes a driver output processor for directing the actual printing of the print job. In addition to directing the storage of the intermediate representation, the program code which implements the driver output processor may create a page object and/or a page object set for the print job. These objects serve as interfaces to the data stored as the intermediate representation and to the other information needed to draw the print job or portions of the job to a printer.

In one form of the invention a user specifies a desired printer technology setting to set the driver arrangement to respond with the appropriate driver type response. The desired printer technology setting is specified through a technology specifying arrangement which may be associated with a user interface for the job editing and delivery system. Through the technology specifying arrangement, the user may choose the desired printer technology setting from among a plurality of stored printer technology settings. Once the desired printer technology setting is specified, the printer driver according to the invention responds to any print job communications with a driver type response appropriate to the printer technology associated with the specified printer technology setting.

The job capture arrangement according to the present invention further includes a plurality of data handlers and a data handler selection arrangement. The data handlers each include computer program code stored in a suitable data handler storage arrangement. Each data handler is used to direct the printing of a particular type of pass-through data to a particular type of printer. The data handler selection arrangement associates a particular data handler with pass-through data of the corresponding type.

In the preferred form of the invention, the data handler selection arrangement includes scanning program code which causes each data handler to scan the pass-through data in a print job and report a level of support for that pass-through data. Each data handler is associated with a different level of support for a particular type of pass-through data. One data handler after another scans the pass-through data until a particular data handler identifies itself as specifically supporting the particular pass-through data. If no data handler identifies itself as specifically supporting the pass-through data, a data handler which identifies itself as generically supporting the pass-through data is assigned by the selection arrangement to direct the printing of that pass-through data.

Depending upon a number of factors, some data handlers may not support features normally available through the job editing and delivery system. That is, a data handler assigned to handle certain pass-through data may be unable to direct the printing of pass-through data consistent with certain features available in the job editing and delivery system. As used in this disclosure, a "feature" available in the job editing and delivery system comprises a printing function such as "n-up". A "capability" of a printing resource comprises a process that the resource can perform such as scaling or rotation for example. In the preferred form of the invention, each data handler reports capability support to the job editing and delivery system. The job editing and delivery system uses the capability support information to indicate to the user whether a feature normally available through the system is supported for the particular print job in which the pass-through data is included. The indication may be provided through a graphical user interface associated with the job editing and delivery system.

It will be appreciated that the various elements in the apparatus according to the invention are implemented through a suitable data processing system or computer under the control of computer program code. Also, the method steps set out in the following claims are performed through the hardware associated with the data processing system.

The invention facilitates the editing and delivery of print jobs through a job editing and delivery system regardless of the type of printer which may be designated. The print job, including the pass-through data included in the job, may be captured for editing and delivery regardless of any incompatibility between the pass-through data and the designated printer. An appropriate data handler then facilitates drawing the pass-through data to the designated printer even if the printer utilizes a technology type different from the technology type of the pass-through data.

These and other objects, advantages, and features of the invention will be apparent from the following description of the preferred embodiments, considered along with the accompanying drawings.

DESCRIPTION OF THE PREFERRED EMBODIMENTS

Figure 1:
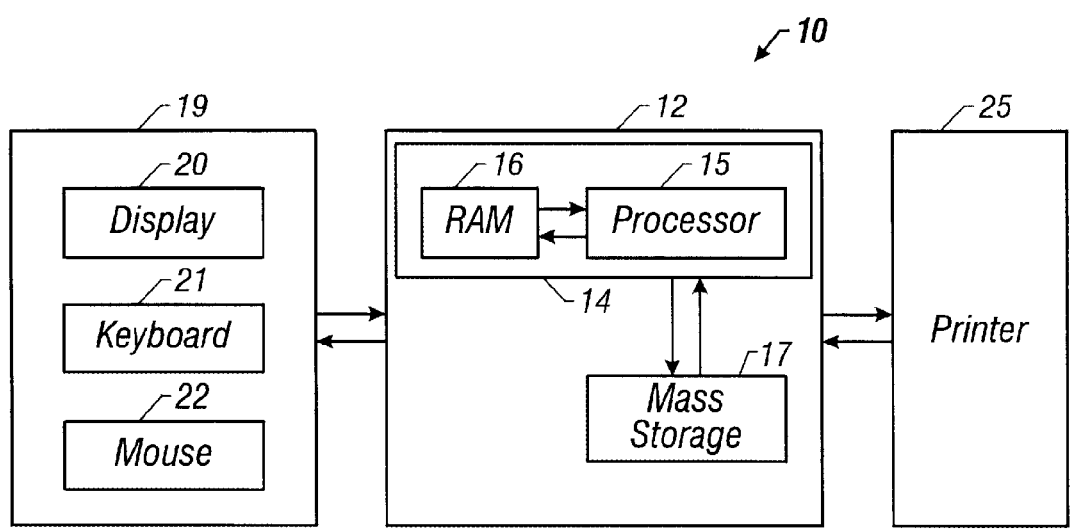
FIG. 1 is a diagrammatic representation of a data processing system through which the invention may be implemented.

Referring to FIG. 1, the invention is implemented through data processing system 10. The illustrated data processing system 10 includes a computer 12 having a processing arrangement 14 including a processor 15 and associated random access memory ("RAM") 16. Computer 12 may comprise a personal computer, workstation, or any other suitable computing device. Mass storage 17 such as a hard disk drive or other mass storage device may be physically associated with computer 12 or may comprise a network resource accessible by the computer. Those skilled in the art will appreciate that computer 12 includes many other components; however, these components are omitted from the drawing so as not to obscure the invention in unnecessary detail.

Data processing system 10 also includes a user interface arrangement shown generally at reference numeral 19 in FIG. 1. User interface arrangement 19 preferably includes a display or monitor 20 for implementing a graphical user interface ("GUI"). A keyboard 21, mouse 22, and perhaps other user input devices may be included in user interface arrangement 19 for providing user inputs either through a GUI or otherwise.

Data processing system 10 also includes at least one printer or other output resource 25 to which print jobs may be directed. Printer 25 may include any type of printer or any other device for physically drawing or producing text or graphics making up a print job. Although one printer 25 is shown in FIG. 1, those skilled in the art will appreciate that many different output resources may be available in data processing system 10, particular when the data processing system is included in a computer network. Commonly, the user must designate the particular output resource for a print job from among many output resources available to data processing system 10. It will also be appreciated that display 20 may comprise an output resource and be designated as the device to which a particular print job will be directed.

Figure 2:
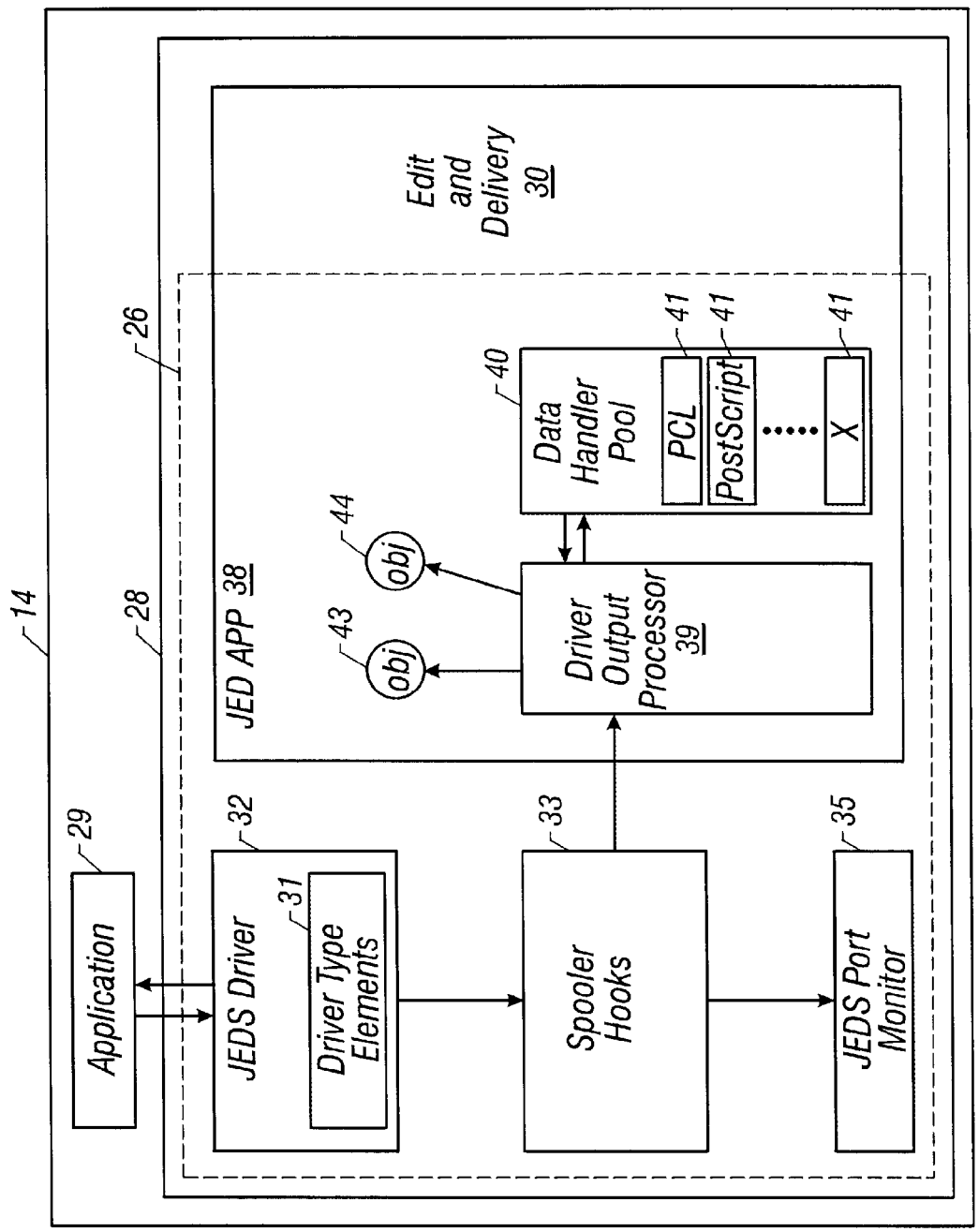
FIG. 2 is a diagrammatic representation of a job editing and delivery system including a print job capture arrangement embodying the principles of the invention.

Referring to FIG. 2, a job capture subsystem 26 is included in a job editing and delivery system 28. Both job capture subsystem 26 and job editing and delivery system 28 are implemented in computer program code executed on processor 15 of data processing system 10. Applications, such as application 29, which provide print jobs to job editing and delivery system 28, are also implemented through data processing system 10. Job editing and delivery system 28 is made up of two basic components. One component comprises the job capture subsystem 26 which is the subject of the present invention. The second component comprises an editing and delivery component 30. Editing and delivery component 30 provides a method for communicating printing features to a user, and a method for receiving job settings invoking one or more of the printing features for a particular print job. A user may also be allowed to designate a desired output resource for a print job through editing and delivery component 30. However, editing and delivery component 30 is not part of the present invention and is discussed here only for the purpose of providing context for job capture subsystem 26. Prior application serial number 09/407,024, entitled "Reusable Job Editing and Delivery System" provides further information regarding job editing and delivery system 28 and editing and delivery component 30. The disclosure of this prior application is incorporated herein by this reference.

Job capture subsystem 26 includes a number of elements, each comprising computer program code preferably loaded into RAM 16. One such element comprises a driver which will be referred to herein as JEDS driver 32. JEDS driver 32 receives print job communications from an application such as application 29 which utilizes job editing and delivery system 28. The manner in which JEDS driver 32 responds to these print job communications causes the driver to appear to the application like a standard printer driver. More particularly, in response to the print job communications from application 29, JEDS driver 32 provides an appropriate driver type response. This appropriate driver type response prompts application 29 to send the data making up the print job to JEDS driver 32. JEDS driver 32 receives the print job data and translates the data into an intermediate representation, which may be in the form of an enhanced metafile, for example. This intermediate representation includes translated data comprising those portions of the print job other than pass-through data, and untranslated data representing buffers of pass-through data.

Regardless of the type of data making up the pass-through data, JEDS driver 32 is capable of responding with the appropriate driver type response to indicate compatibility with the pass-through data in the print job. This is important because applications commonly check the targeted device driver for compatibility with pass-through data in the print job, and will send the print job to the targeted driver in the designated form only if the driver is compatible with the pass-through data. In order to provide the appropriate driver type response and thus present itself as an appropriate driver for taking the pass-through data, JEDS driver 32 maintains a plurality or set 31 of driver-type elements. This set of driver-type elements may be used to produce any of a number of different driver type responses to print job communications from an application 29 desiring to submit a print job to job editing and delivery system 28. For example, where a print job includes PCL pass-through data, JEDS driver 32 responds to print job communications for that particular job by producing a driver type response indicating the JEDS driver is actually a PCL driver. On the other hand, if a print job includes PostScript® pass-through data, JEDS driver 32 responds to print job communications for that job by producing a driver type response which is an appropriate response for a PostScript® driver. For example, where the pass-through data in a print job comprises PCL data, the JEDS driver 32 must support the QUERYESCSUPPORT escape. In the case of PCL pass-through data, JEDS driver 32 must also indicate support for the GETTECHNOLOGY escape and return a string beginning with "PCL". Furthermore, the escape DRAWPATTERNRECT must also be supported in order for JEDS driver 32 to properly respond as supporting PCL pass-through data.

In the preferred form of the invention, the driver type response provided by JEDS driver 32 is selected by the user prior to submitting a print job from application 29. In other words, the printer technology type which JEDS driver 32 imitates is set in advance by the user. In this preferred form of the invention, a number of technology type settings may be stored and be accessible through a user interface associated with job editing and delivery system 28. A user may select a particular technology type setting from this group of available settings. The act of choosing the technology type setting causes JEDS driver 32 to produce a driver type response consistent with that technology type.

Spooler hooks 33 refers to the technique or process which the job capture subsystem 26 uses to take the print job data from driver 32 out of driver space in the operating system and into application space. Port monitor 35 is required only to allow the printer arrangement to appear to the operating system as a standard printer arrangement associated directly with a printer port. Spooler hooks 33 are also associated with a port monitor 35 for providing status information relating to a print job submitted to the job editing and delivery system 28. Spooler hooks 33 and the port monitor 35 are common programming elements and thus will not the described in further detail in this disclosure.

Referring still to FIG. 2, job editing and delivery system 28 includes a component 38 which will be referred to in this disclosure as a JED application. JED application 38, which may actually comprise multiple executable files, includes portions of job capture subsystem 26 and editing and delivery component 30. The portions of job capture subsystem 26 within JED application 38 include a driver output processor 39 and a data handler pool 40. Driver output processor 39 comprises computer program code for receiving the intermediate representation produced by JEDS driver 32 and causing the intermediate representation to be held or stored pending instructions from editing and delivery component 30. Also, in the preferred form of the invention, driver output processor 39 produces page objects 43 and/or page object sets 44 which are used together with the stored intermediate representation to draw a job to a particular output resource as directed by editing and delivery component 30.

Data handler pool 40 includes a number of data handlers shown at reference numerals 41 in FIG. 2, each data handler comprising computer program code responsible for handling a particular type of pass-through data buffer included in a print job. Data handlers 41 are each preferably implemented as a dynamic link library file ("DLL") (more particularly COM components) specific to a particular printer technology type or language. For example, data handler pool 40 may include different types of PCL data handlers, PostScript® data handlers, and data handlers for other printer languages. In the preferred form of the invention data handle pool 40 is implemented so that additional data handlers 41 may be incorporated into the system to accommodate additional types of pass-through data which may be designated by a user. Thus, the data handler arrangement 40 may be implemented to readily support future extensibility, both in terms of additional types of pass-through data and printers.

Data handler pool 40 is associated with a selection arrangement for associating a particular data handler 41 with a particular pass-through buffer included in the intermediate representation. In the preferred form of the invention, the selection arrangement is implemented with buffer scanning program code included in each data handler 41 for causing the respective data handler to scan the pass-through data buffers in a print job as will be described further below. Also, each data handler 41 preferably includes support reporting program code for reporting a level of support for a particular scanned data buffer. The different levels of support may comprise a not supported level, a generically supported level, and a specifically supported level.

Data output processor 39 also preferably includes program code for querying a particular data handler 41 after the data handler is associated with pass-through data. Each data handler 41 also includes a capability support reporting arrangement for reporting printer capabilities which the data handler can not support. This arrangement is used to inform the user when the associated data handler can not support a capability required by a printing feature normally available in job editing and delivery system 28. For example, an "n-up" feature requires scaling capabilities in the output resource and data handler 41. If the data handler 41 associated with certain pass-though data indicates that scaling is not available for the pass-through data, program code associated with driver output processor 39 indicates that any job editing and delivery feature that requires scaling, including the "n-up" feature, for example, is not available. This indication to the user may be provided by graying out an option which may be available in the GUI associated with editing and delivery component 30.

The primary function of data handlers 41 is to direct the printing of the pass-through data with which the data handler may be associated. That is, data handlers 41 direct the printing of untranslated pass-through data buffers included in the intermediate representation produced by JEDS driver 32. The process of drawing a print job for an output resource may be described with reference to FIG. 3. Driver output processor 39 receives instructions from editing and delivery component 30 to draw a page image to an output resource such as output resource 25 shown in FIG. 1. In response to the instruction or call, driver output processor 39 preferably utilizes a page object along with the data contained in the associated intermediate representation to create instructions to draw the desired page image according to the features selected through editing and delivery component 30. Driver output processor 39 itself handles the translated portions of the intermediate representation and produces information in the appropriate form for controlling the actions of the designated output resource. However, driver output processor 39 defers to the data handler 41 associated with any pass-through data in the intermediate representations for providing the instructions to draw the pass-through data. In deferring to the data handler, the particular data handler 41 is first made aware of the designated printer to which the image is to be drawn. If the data handler 41 determines that the pass-through data is in the appropriate language for the designated printer, the data handler directs the printing of the pass-through data by simply passing the pass-through data to the printer. Otherwise, the data handler 41 directs the printing of the pass-through data by sending the data to the designated printer through a suitable interface. A suitable interface in the Windows™ environment comprises the Windows™ Graphics Device Interface ("GDI").

Figure 4:
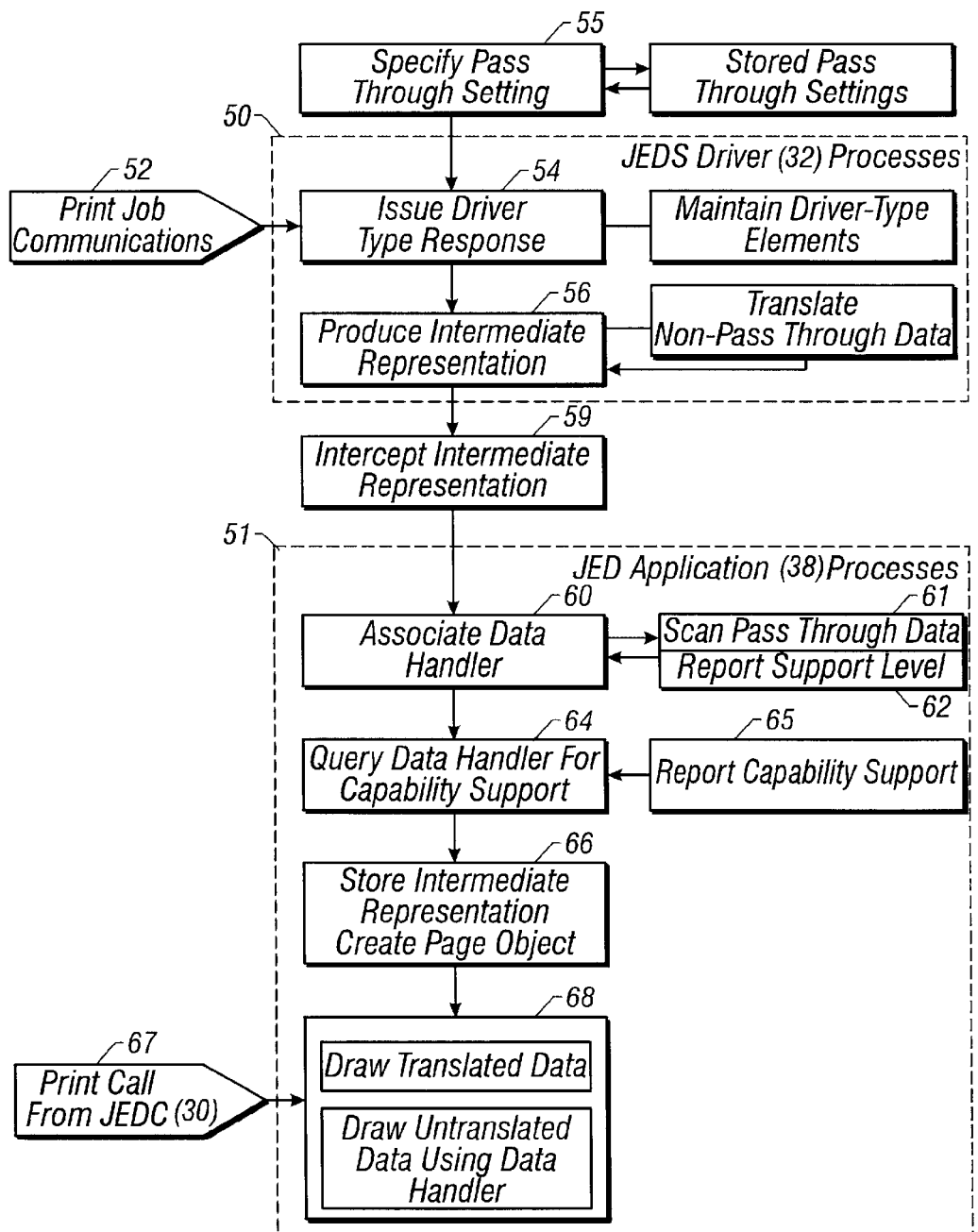
FIG. 4 is a process flow chart showing a print job capture method according to the invention.

The method of capturing a print job including pass-through data may be described with reference to FIG. 4 and the components shown in FIG. 2. FIG. 4 is divided primarily into method steps performed or associated with JEDS driver 32 and method steps performed at application 38. Steps associated with JEDS driver 32 are shown in dashed box 50, while job editing and delivery application steps are shown in dashed box 51.

Referring to dashed box 50, JEDS driver 32 receives printer job communications directed from an application such as application 29 which utilizes job editing and delivery system 28 (shown in FIG. 2). The print job communications are preliminary to the transfer of data representing the print job to JEDS driver 32. In response to the print job communications, JEDS driver 32 issues an appropriate driver type response as indicated in process box 54. The appropriate driver type response may be developed from a number of driver-type elements maintained in a DLL file which comprises JEDS driver 32. This appropriate driver type response is a response specific to the technology type of pass-through data included in the print job which is the subject of print job communications received at block 52.

In the preferred form of the invention, a user specifies a printer technology setting, as shown at block 55, through a suitable user interface associated with editing and delivery component 30 (FIG. 2). The technology specifying arrangement preferably maintains a number of technology type settings such as settings for PCL data and PostScript® data, for example. Once the printer technology setting is communicated to JEDS driver 32, the driver will issue a driver type response specific to that particular setting in response to any print job communications directed to the driver. Thus, in this implementation of the invention, the user must specify a technology setting for JEDS driver 32 which matches the pass-through data included in a job the user directs to job editing and delivery system 28.

Once the appropriate driver type response is issued by JEDS driver 32 at process block 54, the data representing the print job is communicated to the driver and the driver produces the intermediate representation as shown at process block 56. Producing the intermediate representation includes the step of translating data other than pass-through data and incorporating untranslated pass-through data with the translated data. The intermediate representation may comprise any suitable data arrangement and preferably comprises an enhanced metafile.

The intermediate representation produced by JEDS driver 32 is intercepted as shown in process block 59 and directed to JED application 38. This interception step is performed by a suitable spooler hook arrangement 33 as discussed above with reference to FIG. 2.

Upon receipt of the intermediate representation, driver output processor 39 associated with JED application 38 holds the data and allows an appropriate data handler 41 to associate itself with the pass-through buffers included in the intermediate representation as shown at block 60 in FIG. 4. This association is preferably performed by first allowing each data handler 41 in pool 40 (shown in FIG. 2) to scan the pass-through data at process block 61 and report a support level as indicated at block 62. Once a data handler 41 reports a specifically supported level, the particular data handler is associated with that pass-through data. If no data handler 41 reports that it specifically supports the data then a data handler which has reported a "a generic/supported" level is associated with the particular pass-through data.

In the preferred form of the invention, driver output processor 39 (FIG. 2) queries the selected or associated data handler 41 for printer capability support as shown at block 64. The queried data handler 41 reports capabilities which it does not support at block 65. This report prompts driver output processor 39 to indicate to a user that features which require those capabilities are unavailable for this particular print job. Preferably the indication is made through a suitable GUI associated with editing and delivery component 30.

Once the pass-through data is associated with an appropriate data handler 41, driver output processor 39 stores the intermediate representation and preferably creates page objects and/or page object sets as shown at block 66. These objects encapsulate information and references to information such as a data handler and intermediate representation data needed to draw an image within the print job.

Figure 3:
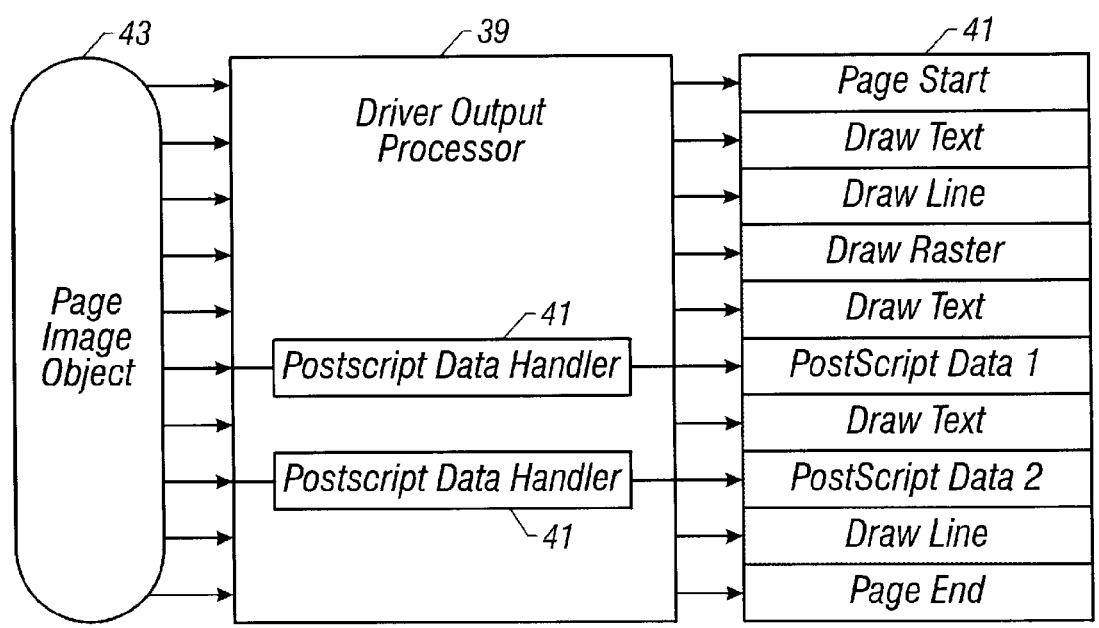
FIG. 3 is a diagrammatic illustration showing the use of a data handler for directing the printing of pass-through data in a print job.

At this point driver output processor 39 simply waits for directions from job editing delivery component 30 to draw a particular image from the print job. These directions are preferably in the form of a call from the editing and delivery component of the job capture subsystem 26 as indicated in process block 67. In response to the call, driver output processor 39 draws the image dictated by the translated data directly and draws the image dictated by the untranslated pass-through data with the aid and direction of the associated data handler 41. This image draw information is passed to the designated output resource for printing or displaying as appropriate to the particular output resource (as indicated in FIG. 3).

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A method for capturing a print job in a print job editing and delivery system, the print job containing pass-through data, the pass-through data comprising data in any one of a plurality of different printer technology types, and the method comprising the steps of:

(a) maintaining driver type response elements from which any one of a plurality of driver type responses can be formed, each driver type response being specific to one of the plurality of printer technology types;

(b) receiving print job communications in response to a print job request, the print job communications being specific to the printer technology type of the pass-through data;

(c) responding to the print job communications with an appropriate driver type response, the appropriate driver type response comprising a particular one of the plurality of driver type responses which is specific to the printer technology type of the pass-through data; and (d) translating the data representing the print job into an intermediate representation of the print job, the intermediate representation comprising translated data representing the portions of the print job other than the pass-through data, and one or more buffers of untranslated data representing the pass-through data.

2. The method of claim 1 further comprising the steps of:

(a) maintaining a plurality of printer technology settings accessible through the job editing and delivery system, each printer technology setting being associated with a different printer language;

(b) specifying a desired printer technology setting from the plurality of printer technology settings, the desired printer technology setting corresponding to the printer technology type of the pass-through data.

3. The method of claim 2 further comprising the steps of:

(a) specifying an additional printer technology setting from the plurality of printer technology settings, the additional printer technology setting being different from the desired printer technology setting and corresponding to the printer technology type of pass-through data contained in an additional print job;

(b) receiving additional print job communications made in response to an additional print job request entered through the job editing and delivery system, the additional print job communications being specific to the particular printer technology type of the pass-through data contained in the additional print job;

(c) responding to the additional print job communications with an additional driver type response, the additional driver type response comprising a particular one of the plurality of driver type responses which is specific to the printer technology type of the pass-through data contained in the additional print job; and (d) translating the data representing the additional print job into an additional intermediate representation, the additional intermediate representation comprising translated data representing portions of the additional print job other than the pass-through data therein, and one or more buffers of untranslated data representing the pass-through data included in the additional print job.

4. The method of claim 1 further comprising the step of:

(a) associating the pass-through data with a particular data handler from a plurality of data handlers contained within a data handler pool, each data handler in the pool providing support for printing a type of pass-through data, the particular data handler providing support for printing the type of data making up the pass-through data contained in the print job.

5. The method of claim 4 wherein the step of associating the pass-through data with a particular data handler comprises the step of:

(a) scanning pass-through data information associated with the pass-through data with the particular data handler to determine level of support provided by the particular data handler for the type of data making up the pass-through data.

6. The method of claim 5 wherein the step of associating the pass-through data with a particular data handler further comprises the step of:

(a) sequentially scanning the pass-through data information with the data handlers included in the plurality of data handlers until the particular data handler scans the pass-through data information and identifies itself as the appropriate data handler for the pass-through data.

7. The method of claim 4 wherein each data handler in the plurality of data handlers is associated with a respective level of support for the data making up the pass-through data, each respective level of support being selected from the group consisting of a not-supported level, a generically supported level, and a specifically supported level.

8. The method of claim 4 further comprising the steps of:
   (a) querying a particular data handler for capability support; and
   (b) indicating to a user when a feature available in the print job editing and delivery system is not supported by the particular data handler.

9. The method of claim 4 further comprising the steps of:
   (a) directing the printing of that portion of the print job represented by the translated portions of the intermediate representation; and
   (b) utilizing the particular data handler with which the pass-through data has been associated to direct the printing of the untranslated data representing the pass-through data.

10. An apparatus for capturing a print job in a print job editing and delivery system, the print job containing pass-through data comprising data in any one of a plurality of different printer technology types, the apparatus comprising:
    (a) a print job editing and delivery system driver arrangement for,
        (i) maintaining a plurality of driver type response elements from which any one of a plurality of driver type responses can be formed, each driver type response being specific to one of the plurality of printer technology types, and
        (ii) providing an appropriate driver type response to print job communications from a process utilizing the job editing and delivery system, the appropriate driver type response comprising a particular one of the plurality of driver type responses which is specific to the printer technology type of the pass-through data contained in the print job, and
        (iii) translating the data representing the print job into an intermediate representation of the print job, the intermediate representation comprising translated data representing portions of the print job other than the pass-through data, and also comprising one or more buffers of untranslated data representing the pass-through data; and
    (b) a storage arrangement for storing the intermediate representation of the print job prior to delivery of the print job to an output resource.

11. The apparatus of claim 10 further comprising:
    (a) a printer technology storage device storing a plurality of printer technology settings, the printer technology settings being accessible through the job editing and delivery system, and each printer technology setting being associated with a different printer language; and
    (b) a technology specifying arrangement for specifying a desired printer technology setting from the plurality of printer technology settings, the desired printer technology setting corresponding to the printer technology type of the pass-through data.

12. The apparatus of claim 10 further comprising:
    (a) a data handler storage arrangement storing a plurality of data handlers, each data handler providing support for printing a type of pass-through data; and
    (b) a data handler selection arrangement for associating the pass-through data with a particular data handler from the plurality of data handlers, the particular data handler providing support for printing the type of data making up the pass-through data contained in the print job.

13. The apparatus of claim 12 wherein the data handler selection arrangement includes:
    (a) a data scanning arrangement for scanning pass-through data information associated with the pass-through data to identify the particular data handler which supports the type of data making up the pass-through data.

14. The apparatus of claim 13 wherein:
    (a) the data scanning arrangement causes the data handlers in the data handler pool to individually scan the pass-through data information until the particular data handler scans the pass-through data and identifies itself as the appropriate data handler for the pass-through data.

15. The apparatus of claim 12 wherein each data handler in the plurality of data handlers is associated with a respective level of support for the data making up the pass-through data, each respective level of support being selected from the group consisting of a not supported level, a generically supported level, and a specifically supported level.

16. The apparatus of claim 12 further comprising:
    (a) a capability support identifying arrangement for identifying the capability support provided by the particular data handler; and
    (b) a user interface arrangement for indicating to a user the unavailability of a normally available feature in the print job editing and delivery system in the event the capability support provided by the particular data handler indicates that the normally available feature is not supported by the particular data handler.

17. The apparatus of claim 12 further comprising:
    (a) a driver output processor arrangement for directing the printing of that portion of the print job represented by the translated portions of the intermediate representation, and for utilizing the data handler with which the pass-through data has been associated to direct the printing of the untranslated data representing the pass-through data, the printing being performed at an output resource available to the print job editing and delivery system.

18. A print job capture computer program product stored on a computer readable medium, the program product being executable on a computer to capture a print job in a print job editing and delivery system implemented through the computer, the print job containing pass-through data comprising data in any one of a plurality of different printer technology types, and the computer program product comprising:
    (a) driver program code for,
        (i) maintaining a plurality of driver type response elements from which any one of a plurality of driver type responses can be formed, each driver type response being specific to one of the plurality of printer technology types, and
        (ii) providing an appropriate driver type response to print job communications from a process utilizing the job editing and delivery system, the appropriate driver type response comprising a particular one of the plurality of driver type responses which is specific to the printer technology type of the pass-through data contained in the print job, and (iii) translating the data representing the print job into an intermediate representation of the print job, the intermediate representation comprising translated data representing portions of the print job other than the pass-through data, and also comprising one or more buffers of untranslated data representing the pass-through data; and (b) intermediate representation storage program code for causing the intermediate representation of the print job to be stored prior to delivery of the print job to an output resource.

19. The computer program product of claim 18 further comprising:

(a) printer technology program code including a plurality of printer technology settings which are accessible through the job editing and delivery system, each printer technology setting being associated with a different printer language;

(b) printer technology specifying program code for enabling a desired printer technology setting to be specified from the plurality of printer technology settings, the desired printer technology setting corresponding to the printer technology type of the pass-through data.

20. The computer program product of claim 18 further comprising:

(a) data handler program code including a plurality of data handlers, each data handler providing support for printing a type of pass-through data; and (b) data handler selection program code for associating the pass-through data with a particular data handler from the plurality of data handlers, the particular data handler providing support for printing the type of data making up the pass-through data contained in the print job.

21. The computer program product of claim 20 wherein the data handler selection program code includes:

(a) data scanning program code for scanning the pass-through data information associated with the pass-through data to identify the particular data handler which supports the type of data making up the pass-through data.

22. The computer program product of claim 21 wherein:

(a) the data scanning program code causes the data handlers in the data handler pool to individually scan the pass-through data information until the particular data handler scans the pass-through data and identifies itself as the appropriate data handler for the pass-through data.

23. The computer program product of claim 20 wherein each data handler in the plurality of data handlers is associated with a respective level of support for the data making up the pass-through data, each respective level of support being selected from the group consisting of a not supported level, a generically supported level, and a specifically supported level.

24. The computer program product of claim 20 further comprising:

(a) capability support identifying program code for identifying the capability support provided by the particular data handler; and (b) user interface program code for causing a user interface to indicate to a user the unavailability of a normally available feature in the print job editing and delivery system in the event the capability support provided by the particular data handler indicates that the normally available feature is not supported by the particular data handler.

25. The computer program product of claim 18 further comprising:

(a) driver output processor program code for directing the printing of that portion of the print job represented by the translated portions of the intermediate representation, and for utilizing the data handler with which the pass-through data has been associated to direct the printing of the untranslated data representing the pass-through data, the printing being performed at an output resource available to the print job editing and delivery system.

* * * * *